May 26, 1953
A. C. GROSS
2,639,746
FRUIT PEELING AND CORING MACHINE
Filed Sept. 21, 1950
3 Sheets-Sheet 1
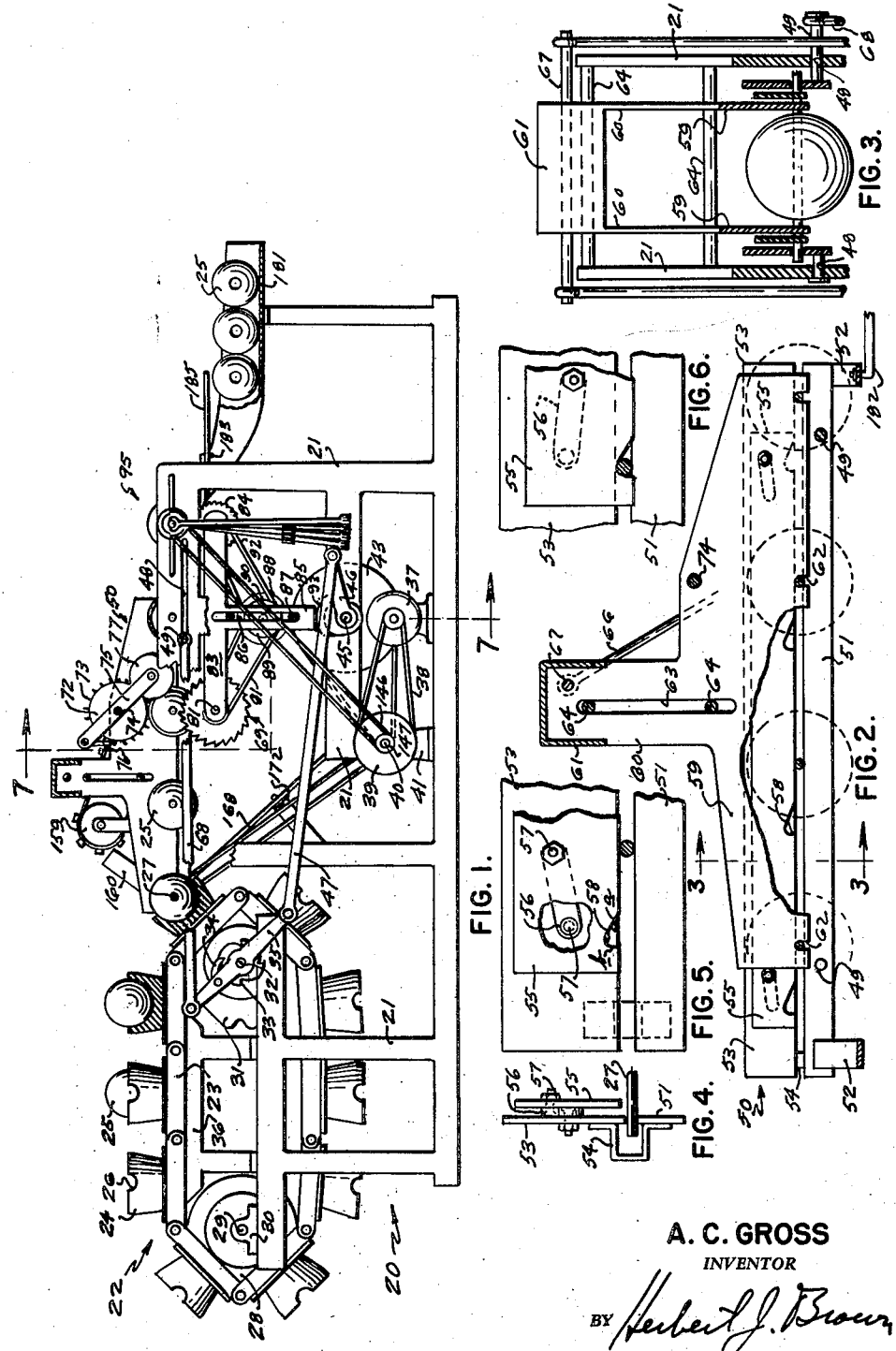
A. C. GROSS
INVENTOR
BY Herbert J. Brown
ATTORNEY May 26, 1953 A. C. GROSS 2,639,746
FRUIT PEELING AND CORING MACHINE
Filed Sept. 21, 1950 3 Sheets-Sheet 2

A.C. GROSS
*INVENTOR*

BY *Herbert J. Brown*

*ATTORNEY*

May 26, 1953 A. C. GROSS 2,639,746
FRUIT PEELING AND CORING MACHINE
Filed Sept. 21, 1950 3 Sheets-Sheet 3
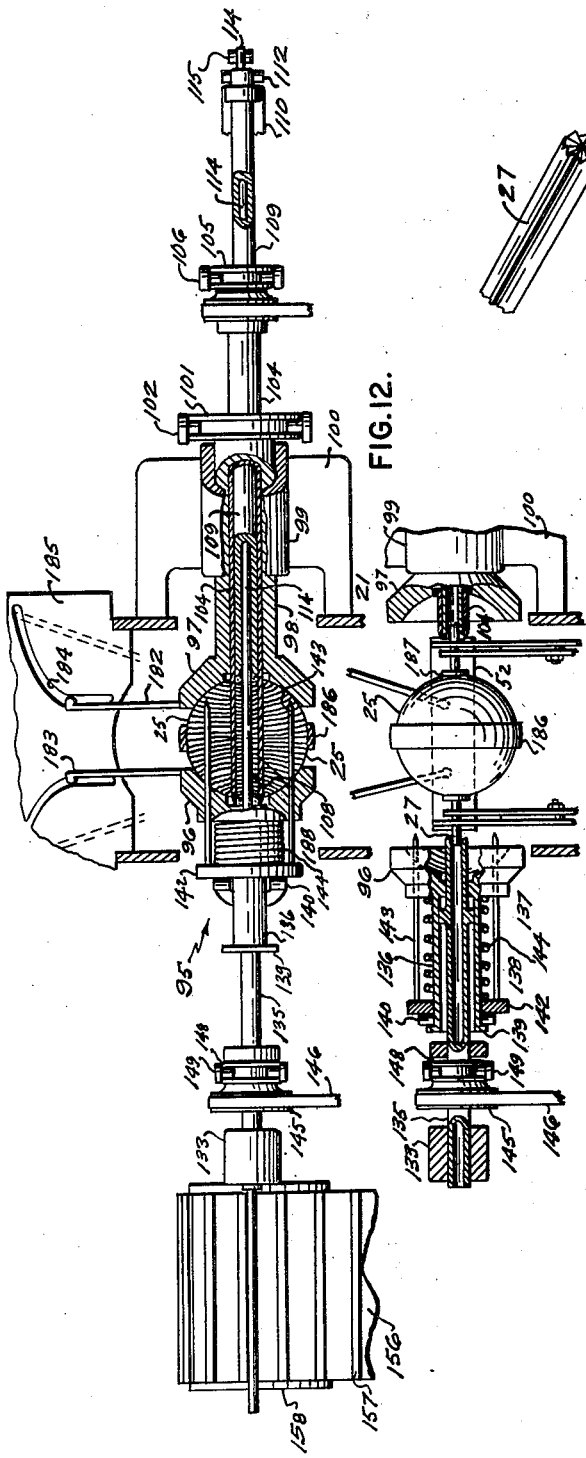
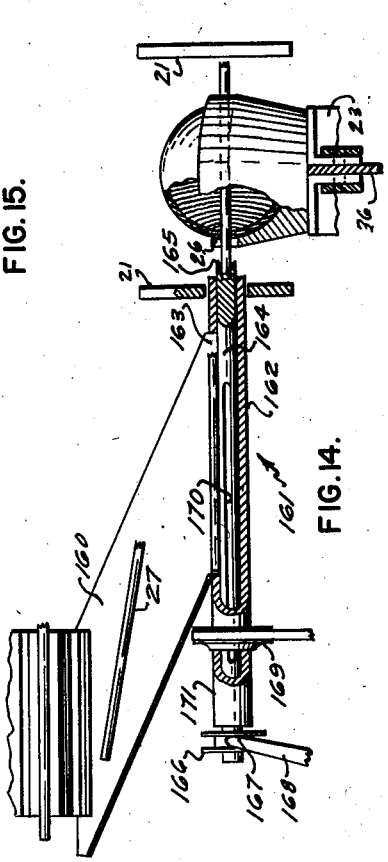
A. C. GROSS
INVENTOR
BY Herbert J. Brown
ATTORNEY Patented May 26, 1953

2,639,746

UNITED STATES PATENT OFFICE 2,639,746

FRUIT PEELING AND CORING MACHINE

Angell C. Gross, Harlingen, Tex.

Application September 21, 1950, Serial No. 186,018

5 Claims. (Cl. 146—38)

This invention relates to improvements in fruit peeling and coring machines, such as shown and described in Letters Patent No. 2,465,223, issued to me on March 22, 1949.

An object of the invention is to provide a construction for steadying the fruit supporting pins as they are moved through the machine and whereby the speed of operation may be increased.

Another object of the invention is to provide means for mechanically positioning the pins through the cores of the fruit.

Another object is to provide means for firmly supporting the fruit during the primary peeling operation.

A further object of the invention is to provide means for removing the fruit supporting pins from the severed cores and returning and inserting the same in the cores of the unpeeled and uncored fruit.

The invention will be more readily understood by reference to the accompanying drawings and the following description.

Figure 1 is a side elevation of a fruit peeling and coring machine embodying the present improvements.

Figure 2 is a vertical longitudinal section of the pin holder and the pin carrier.

Figure 3 is a sectional view taken on lines 3—3 of Figure 2.

Figure 4 is a broken end view of one side of the pin carrier.

Figure 5 is an enlarged broken end view of the pin carrier as it appears during its return operation.

Figure 6 is similar to Figure 5, but showing the pin carrier as it appears during the pin moving operation.

Figure 12 is a plan and broken sectional view of the coring mechanism as it appears during the coring operation.

Figure 13 is a view similar to Figure 12, but showing the position of the mechanical parts prior to coring the fruit.

Figure 14 is an elevation and broken sectional view of the pin inserting mechanism.

Figure 15 is a broken perspective view showing the boring end of one of the fruit carrying pins.

Figure 10:
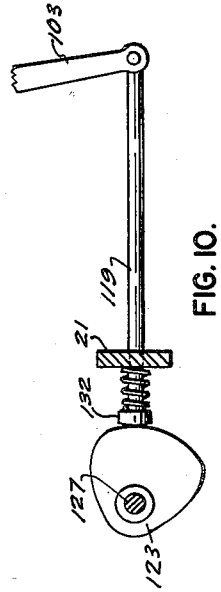
Figure 10 is an elevation of a typical cam, push rod and cam arm arrangement as shown in Figures 8 and 9.

In the drawings, the numeral 20 generally designates a rectangular frame having parallel sides 21 shaped to accommodate and support various parts and subassemblies to be described. A conveyor 22 is mounted on the forward end of the frame 20 and is comprised of joined pivotally connected relatively long links 23, each of which supports a cup 24 mounted thereon for receiving the fruit 25 to be peeled and cored. Opposing notches 26 are formed in the upper edge of each cup 24 to accommodate fruit supporting pins 27, hereinafter referred to in detail. The conveyor 22 is supported at its outer end by a roller 28 on a shaft 29 journaled in bearings 30 supported by the frame 20, as shown in Figure 1. The other end of the conveyor 22 is mounted on a sprocket 31 also mounted on a shaft 32 supported by the frame 20, and which sprocket is constructed to accommodate and engage the relatively long links 23. There is a ratchet 33 secured to the last described shaft 32, and arranged to coact with a pawl 34 mounted on one side of a double arm 35 journaled on said shaft. The upper links 23 of the conveyor 22 slidably move on and are supported by a table 36 mounted on the forward end of the frame 20.

Figure 8:
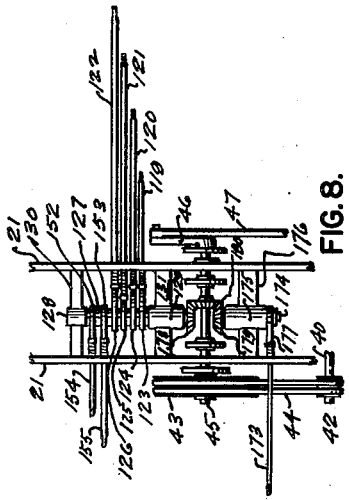
Figure 8 is a broken plan view of the cam mechanism for slidably actuating certain parts of the coring mechanism.

A motor 37 is mounted on the lower portion of the frame 20 and is connected by means of a belt 38 with a driven pulley 39 for driving a countershaft 40 positioned through and secured to the latter. The shaft 40 is journaled in a bearing support 41, also secured to the frame 20. A double pulley 42 (see Figure 8) mounted on one end of the shaft 40 drives another, but larger, double pulley 43 by means of belts 44. The pulley 43 last referred to is mounted on a shaft 45 journaled in the frame sides 21 and drives a crank 46 which, in turn, is connected with the first described arm 35 by means of a driving rod 47. The length of the crank 46 and the length of the arm 35 are such that any one link 23 of the conveyor 22 will move its own length during one revolution of said crank. As will become apparent, the same distance is employed between various stages of movement of the fruit 25 through the carrier operations, to be described.

Horizontal slots 48 are formed in opposite sides of the frame sides 21 and accommodate lugs 49 projecting from the sides of a pin carrier assembly 50, illustrated in detail in Figures 2 through 6. The carrier 50 is comprised of parallel rails 51 secured to each other by U-shaped brackets or cross-members 52. Plates 53 positioned above and parallel with the rails 51 and are connected therewith by means of outwardly directed U-shaped brackets 54, as shown in Figure 4. The purpose of the spacing between the plates 53 and the rails 51 is to accommodate the projecting ends of the pins 27. Hook plates 55 are attached to the inner surfaces of the first referred to plates 53 by means of links 56 pivotally secured to said parts by means of bolts 57, in the manner shown in Figures 4 through 6. The lower edges of the hook plates 55 are provided with hook shaped notches 58, the notches of the respective plates being positioned parallel and in pairs with respect to each other. As shown in Figures 5 and 6, the hook shaped notches 58 have their inclined sides a directed toward the discharge end of the machine, whereas the substantially perpendicular sides b are positioned toward the conveyor 22. Holddown plates 59 are positioned inwardly of the hook plates 55 and are provided with upwardly directed extensions 60 near their centers, and the upper ends of said extensions are connected by an inverted U-shaped channel 61. The lower edges of the holddown plate 59 are provided with notches 62 for engaging the extending ends of the pins 27 during certain phases of the operation, to be described. The connected holddown plates 59 are capable of vertical movement by reason of vertical slots 63 in their extensions 60 which slidably accommodate cross rods 64 secured to the frame sides 21, as shown in Figures 2 and 3. Cams 65 on the driven shaft 45 actuate lift rods 66, the upper ends of which are pivotally connected with the holddown plate extensions 60 by means of a shaft 67 passing therethrough. The timing of the cams 65 is such that the pins 27 are held downwardly against the rails 51, except when said pins are moved therealong by means of the hook plates 55. The last referred to action is carried out by means of a connecting rod 68 connected with one of the carrier lugs 49 and with the end of the double arm 35 opposite the latter's connection with the first described driving arm 47.

In the illustrated form of the invention, there are four pairs of hook recesses 58 spaced at equal intervals along the length of the hook plates 55, and there are four corresponding and equally spaced pairs of notches 62 in the holddown plates 59. As the fruit 25 impaled upon pins 27 reach the third stage, it is acted upon by cutters 69 for removing all of the rind except a strip about the center of the fruit and the opposite sides thereof. In this connection it is pointed out that the fruit is placed in the cups 24 with the core of the fruit aligned with the opposing notches 26 in the cups. In the description of operation for inserting the pins 27, it will become apparent that said pins are positioned through the axial centers of the cores. The cutter assembly 69 is comprised of multiple disk cutters 70 of different diameters on each side thereof and having a spacer 71 positioned therebetween. The cutters are arranged to conform with the contour of the fruit 25 except around the circumferential center which is engaged by a pressure wheel 72 having radially extending pins 73 around its rim. The pressure wheel 72 is mounted on a shaft 74 secured between the inner walls of the holddown plates 59. Arms 75 are mounted on the shaft 74 and on opposite sides of the pressure wheel 72 and have their upper ends connected with the frame sides 21 by means of connecting links 76, as shown in detail in Figure 7. The ends of the arms 75 opposite the links 76 are provided with a contour roller 77 mounted on a shaft 78. The roller 77 is auxiliary to the pressure wheel 72 and is for the purpose of providing additional stability for holding the fruit 25 against the action of the cutters 70. When the holddown plates 59 move upwardly, the rollers 77 are removed from the fruit 27, as is the pressure wheel 74, but by reason of the described pivotal arrangement of the arms 75, the rollers 77 move a greater distance than said wheel. The shaft 74 on which the pressure wheel 72 is mounted is driven by a large pulley 79 on the outer end of said shaft, and which pulley is connected with a smaller pulley 80 on the cutter shaft 81 by means of a belt 82.

Figure 7:
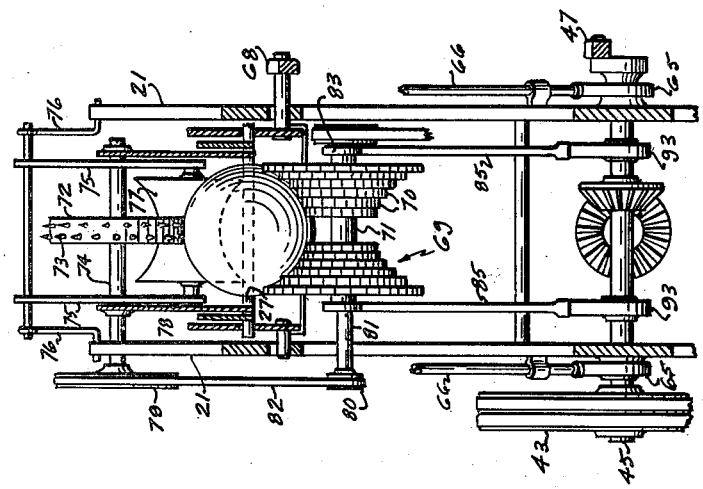
Figure 7 is an enlarged section taken approximately along lines 7—7 of Figure 1.
Figure 11:
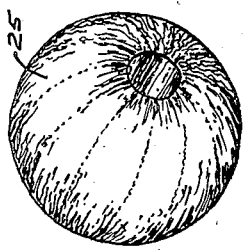
Figure 11 is a perspective view of a citrus fruit, and showing the same as it appears after being peeled and cored by the herein described machine.

Referring now to Figures 1 and 7, the cutter shaft 81 is mounted in one end of a subframe 83, and which frame supports another cutter 84 on its outer end, constructed and arranged for removing circumferential remaining portion of the rind after the first cutting operation. There is an integral depending arm 85 extending from each side of the frame 83, each of which is provided with vertical slots 86 for sliding contact with transverse bars 87 connected with the frame sides 21. A motor 88 is mounted between depending portions 85 and which motor includes pulleys 89 and 90 and driving belts 91 and 92, respectively, for driving the cutters 70 and 84. In the last referred to arrangement it will be obvious to those versed in the art that the cutters 70 and 84 may be driven by the first described motor 37 without departing from the spirit and intention of the invention. The frame 83 is raised and lowered by contact with cams 93 on the driven shaft 45.

Figure 9:
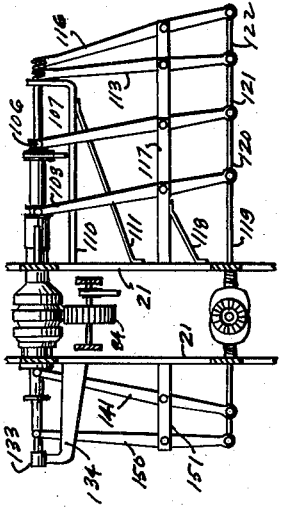
Figure 9 is a vertical section and elevational view of Figure 8 and showing the cam arms connected with the coring mechanism.

As shown in Figures 12 and 13, the machine is provided with a coring mechanism similar to the one illustrated and described in my prior Patent No. 2,465,223, and differs therefrom in that the pins are removed from the severed core. The coring mechanism is generally designated by the numeral 95 and includes opposing cups 96 and 97 for engaging the fruit 25 during the coring operation. One of the cups 97 is mounted on the end of a tubular shaft 98 and is slidably mounted in a bearing 99 supported by a table 100 secured to one of the frame sides 21. The outer end of the shaft 98 has a thrust collar 101 which is engaged by a yoke 102 on the end of an actuating arm 103. The last referred to arm 103 is shown in Figure 9. A relatively thin tubular corer 104 is slidably positioned within and extends through the tubular shaft 98 and has an annular thrust collar 105 on its outer end. A yoke 106 on the end of an actuating arm 107 engages the thrust collar 105 for moving the corer inwardly and to the bottom of the opposing cup 96. The resulting severed core 108 is not removed from the fruit 25 until the latter is removed from the cups 96 and 97. Within the corer 104 there is a tubular bearing 109 having its inner end arranged to be even with the cup 97 and having its outer end extending substantially beyond the outer end of the corer. The bearing 109 is supported in the side frame 21 by means of an arm 110 which, in turn, is supported by a bracket 111. The bearing 109 moves inwardly and outwardly with the cup supporting shaft 98, and which operation is carried out by means of a fork 112 on the end of an arm 113. A pin ejector 114 is slidably positioned in the bearing 109 and is moved inwardly and outwardly by another fork 115 on the end of an arm 116. The length of the pin ejector 114, and movement thereof is sufficient to eject the pins 27 from the core 103 in a direction outwardly from the corer's inner end. All of the last described arms 103, 107, 113 and 116 are pivotally mounted on an arm 117 extending from the frame side 21 and supported by a bracket 118. The lower ends of the arms are respectively connected with push rods 119, 120, 121 and 122, which, in turn, are actuated by cams 123, 124, 125 and 126, all of which are mounted on a shaft 127 mounted in bearings 128 and 129 supported by brackets 130 and 131, respectively, secured to the opposing faces of the side frames 21. One of the push rods 119, is illustrated in detail in Figure 10, and it is to be understood that the remaining push rods 121 and 122 are similarly installed and are slidably positioned through a portion of one side frame 21. The push rod 119 has an enlarged inner end 132 for bearing against the cam 123 and a compression spring is positioned around the rod and between the enlarged end thereof and the inner surface of the adjacent frame side 21. The outer end of the rod 119 is hingedly connected with the cup actuating arm 103. The said remaining arms are provided with springs, not shown, similar to the described compression spring 132.

The side of the corer 95 including the first referred to cup 96 is provided with a bearing 133 mounted on an arm 134 secured to one of the frame sides 21. A tubular shaft 135 is mounted in the bearing 133 and extends inwardly through a tubular member 136 integral with the outer end of the cup 96. Keys 137 on the tubular shaft 135 slidably engage splines 138 in the inner surface of the tubular member 136. The outer end of the tubular member 136 has an outwardly directed flange 139 for engaging a yoke 140 on the end of an arm 141. A collar 142 is longitudinally slidably mounted around the tubular member 136 and supports inwardly directed turning pins 143 which slidably pass through the adjacent cup 96 and into the fruit 27 during certain phases of the coring operation. A compression spring 144 is positioned around the tubular member 136 and between the collar 142 and the cup 96 for normally maintaining the pins 143 in the outer or withdrawn position. The tubular shaft 135 is driven by means of a pulley 147 on the counter-shaft 40. A slight longitudinal movement is imparted to the tubular shaft 135 for engaging an end of the fruit carrying pins 27 during certain phases of the coring operation, and is carried out by means of a thrust collar 148 and a yoke 149 engaged therein. The yoke 149 is on the end of an arm 150, and which arm, together with the last described corresponding arm 141, is mounted on a supporting arm 151 secured to one of the frame sides 21, as shown in Figure 9. The lower ends of the arms 141 and 150 are actuated by cams 152 and 153 mounted on the previously described shaft 127 and connected by push rods 154 and 155, respectively, and in the manner illustrated in Figure 10.

As will become apparent in the description of the operation, the pins 27 are ejected outwardly through the tubular shaft 135 and fall on a conveyor belt 156 having spaced transverse ribs 157 on its outer surface. The belt 156 is mounted on a roller 158 outwardly of and beneath the tubular shaft supporting bearing 133, and its other end is supported by another roller 159 positioned above and near the forward end of one side of one of the holddown plates 59. The supporting and driving mechanism for the conveyor belt 156 is thought to be obvious and is not, therefore, described in detail. Referring now to Figure 14, there is a chute 160 positioned beneath the discharge end of the conveyor belt 156, and is shaped to hold and align the pins 27 above a pin loading mechanism 161 comprised of an elongated tubular bearing 162 having a longitudinal slot 163 in its upper surface for receiving said pins. The axial center of the bearing 162 is in alignment with the recesses 26 in the cups 24 on the fruit conveyor 22 when the referred to cups are respectively positioned adjacent the forward end of the carrier assembly 50. Within the bearing 162 there is a longitudinally slidable plunger 164 having a recessed end 165 for engaging corresponding ends of the pins 27. The other and extending end of the plunger 164 is provided with a thrust collar 166 engaged by a yoke 167 on the end of an arm 168. A pulley 169 is mounted on the plunger 164 and is provided with a key, not shown, for engaging a longitudinal spline 170 in said plunger. An additional bearing 171 is positioned outwardly with a pulley 169 to prevent the latter from moving outwardly with respect to the outer end of the first bearing 162. The arm 168 is pivotally mounted on a supporting arm 172 and has its lower end pivotally connected with a push rod 173, the latter being shown in Figure 8. An additional cam supporting shaft 174 is mounted on a bearing 175 mounted between opposing faces of the frame sides 21 by means of brackets 176. One end of the shaft 174 is provided with a cam 177 for actuating the arm 168, the details of which are in accordance with the previously described push rod assembly illustrated in Figure 10. The opposing ends of the cam supporting shafts 127 and 174 are provided with beveled gears 178 and 179 and both of which engage a driving bevel gear 180 on and near the center of the crank actuating shaft 45.

Referring now to the upper central part of Figure 12, means may be provided for loading the peeled and core fruit 25 into a discharge chute 181 supported by the frame 20. A pair of arms 182 are pivotally secured to the carrier cross member 52, and their remaining ends are provided with depending projections 183 for engaging outwardly diverging arcuate slots 184 in a plate 185 secured to the frame 20, and positioned lower than the coring mechanism 95. By reason of the shape of the slots 184 the arms 182 are substantially parallel during the coring operation and are spaced closer together than the width or diameter of the fruit 25. As the cups 96 and 97 open, the movement of the carrier 50 towards the horizontal plate 185 is such that the arms 182 open and allow the fruit to fall gently into the chute 181.

In operation, the fruit 25 is placed in the upper cups 24 of the conveyor 22 with their cores in axial alignment with the radial centers of the cup recesses 26. The action of the driving arm 47, the ratchet 33 and pawl 34 moves the cups 24, by intermittent action, to the forward end of the carrier 50. At this time, the cam 177 actuates the arm 168 and forces the pin 27 in the bearing 162 into and through the core of the fruit 25. The driving arm 68, imparts reciprocating movement to the carrier 50, and intermittently moves the fruit 25 along the length thereof. The extending ends of the pins 27 are supported on the rails 51 during their movement through the carrier 50, and in order to facilitate the operation of the hook recesses 58, the pins 27 are held against longitudinal movement by the holddown plates 59 during the carrier return movement. By reason of the action of the lift cams 65 and the arrangement of the cutter disks 70, the cutter assembly 69 removes all of the rind from the fruit except a band 186 around the circumference, and small disks of rind 187 on each end of the fruit. The operation of the hold wheel 72 and roller 77 rotate and position the fruit 25 against the action of the cutters 70. The wheel 72 is driven by means of the pulley 79 and belt 82 in the manner previously described. During the next stage of operation, the fruit 25 is engaged by the cups 96 and 97, and which engagement is carried out by means of the action of the cams 123 and 152. At this time the lift cams 65 raise the cutter 94 to remove the remaining rind 186. Through the action of the cams 124 the corer 188 is caused to move inwardly and sever the core 188 from the fruit. That the action of the thrust bearings 148 and 105 is such that the ends of the fruit supporting pins are engaged and released at the proper times. After the coring operation is complete, the fork 115 moves the pin ejector inwardly relative to the center of the core 95, causing the pin 27 to be moved outwardly through the tubular shaft 135. Although one or more pins may be present in the length of said shaft, it is to be understood that the last described action causes the outermost pin 27 to be ejected from the tubular shaft 135 and fall on the conveyor belt 156. Thus, the pins are returned to the forward end of the frame 20 where, through the action of the pin injecting plunger 164, they are positioned through the additional fruit 25 positioned in the cups 24, as previously described.

The present invention is not limited to the construction herein shown and described, but may be made in many ways within the scope of the appended claims.

What is claimed is:

1. A machine for peeling and coring fruit comprising a frame, a driven endless conveyor mounted on said frame, fruit holding cups mounted on said conveyor, pins greater in length than the cores of said fruit and the diameters of said fruit holding cups, means positioning said pins through said cores and extending from both ends thereof, a longitudinally reciprocating carrier slidably mounted on said frame and positioned opposite the discharge end of said conveyor, said carrier including spaced parallel rails adapted to support said extending ends of said pins, means moving said fruit along said rails, and including a vertically reciprocating holddown plate constructed and arranged to engage said pins on said rail during the return movement of the latter toward said conveyor, rotary cutter means removing the rind from said fruit while impaled on said pins, a coring mechanism mounted on said frame opposite the discharge end of said carrier, means successively positioning said fruit in said corer and receiving said pins within the axial center thereof, and means ejecting said pins outwardly through the axial center of said corer.

2. In combination with a machine as defined in claim 1, a conveyor belt for one end thereof positioned beneath one side of said coring mechanism and arranged to receive the ejected pins thereon, and the remaining end of said belt being positioned to drop said pins into said means for positioning said pins through the cores of said fruit.

3. In a fruit peeling machine, a carrier for moving fruit impaled on pins wherein the ends of said pins project outwardly from opposing sides of said fruit, a pair of horizontal rails adapted to support the projecting ends of said pins, pairs of hingedly mounted hooks adapted to engage said projecting ends of said pins, means imparting reciprocating movement to said hooks parallel with said rails, and vertically reciprocating plates arranged to hold said pins against said rails during one phase of said reciprocating movement of said hooks.

4. In a fruit peeling machine, a carrier for moving fruit impaled on pins wherein the ends of said pins project outwardly from opposing sides of said fruit, a pair of horizontally reciprocating rails, a plate secured to and spaced above each said rail, hooks hingedly mounted on said plates and having the hook recesses thereof directed toward the upper edges of said rails and adapted to engage said projecting ends of said pins, and vertically reciprocating plates arranged to engage and hold said pins for relative sliding contact with the upper edges of said rails during one phase of said reciprocating movement of said hooks.

5. In a machine for peeling and coring fruit having pins adapted to be positioned through the cores of the fruit to be acted upon and wherein the fruit is moved horizontally through peeling coring apparatus while supported by said pins, the combination of: means at the discharge end of said machine removing said pins from the fruit cores after the same has been peeled and cored, means including an endless belt having traverse ribs on the outer surface thereof conveying said pins to the fruit receiving end of said machine, a pin loading mechanism positioned to receive pins from said conveyor said pin loading mechanism being comprised of a tubular bearing having an elongated pin receiving opening in the upper surface thereof, and a rotatable and reciprocating plunger within said bearing adapted to move a pin therein outwardly thereof and through fruit positioned opposite one end of said tubular bearing.

ANGELL C. GROSS.

References Cited in the file of this patent
UNITED STATES PATENTS

| Number | Name | Date |
|---|---|---|
| 1,692,559 | Miller | Nov. 20, 1928 |
| 1,923,712 | Deitz | Aug. 22, 1933 |
| 2,465,223 | Gross | Mar. 22, 1949 |